United States Patent
Chapman et al.

(12)

(10) Patent No.: US 10,259,079 B2
(45) Date of Patent: Apr. 16, 2019

(54) SYSTEMS AND METHODS FOR KERFING VENEERS

(71) Applicant: GOODRICH CORPORATION, Charlotte, NC (US)

(72) Inventors: Christopher L. Chapman, Lanesville, IN (US); Sayan Rakshit, Bangalore (IN); Tommy R. Hawkins, Scottsburg, IN (US); Satya Swaroop Panda, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 420 days.

(21) Appl. No.: 15/286,870

(22) Filed: Oct. 6, 2016

(65) Prior Publication Data

US 2017/0021457 A1 Jan. 26, 2017

Related U.S. Application Data

(62) Division of application No. 14/316,330, filed on Jun. 26, 2014, now Pat. No. 9,486,978.

(51) Int. Cl.

| | |
|---|---|
| *B23K 26/364* | (2014.01) |
| *B23K 26/402* | (2014.01) |
| *B23K 26/06* | (2014.01) |
| *B23K 26/08* | (2014.01) |
| *B32B 21/14* | (2006.01) |
| *B32B 21/13* | (2006.01) |
| *B32B 3/08* | (2006.01) |
| *B32B 3/26* | (2006.01) |

(Continued)

(52) U.S. Cl.
CPC ........ *B23K 26/364* (2015.10); *B23K 26/0626* (2013.01); *B23K 26/0876* (2013.01); *B23K 26/402* (2013.01); *B27D 5/00* (2013.01); *B27H 1/00* (2013.01); *B32B 3/085* (2013.01); *B32B 3/263* (2013.01); *B32B 21/042* (2013.01); *B32B 21/13* (2013.01); *B32B 21/14* (2013.01); *B23K 2103/36* (2018.08); *B29K 2001/00* (2013.01); *B29L 2009/00* (2013.01); *B32B 2307/546* (2013.01); *B32B 2317/16* (2013.01)

(58) Field of Classification Search
CPC .......................... B23K 26/364; B23K 26/402; B23K 26/0626; B23K 26/0876; B32B 21/14; B32B 21/13; B32B 3/085; B32B 3/263; B27D 5/00; B27H 1/00
USPC ........................................ 219/121.67–121.72
See application file for complete search history.

(56) References Cited

U.S. PATENT DOCUMENTS

| | | | |
|---|---|---|---|
| 4,681,146 A * | 7/1987 | Liska | ............ B27L 11/00 144/162.1 |
| 5,540,025 A | 7/1996 | Takehara | |

(Continued)

OTHER PUBLICATIONS

Office Action dated Oct. 6, 2015 in French Application No. 15 55888.

(Continued)

*Primary Examiner* — Samuel M Heinrich
(74) *Attorney, Agent, or Firm* — Snell & Wilmer, L.L.P.

(57) ABSTRACT

Systems and methods are disclosed herein for laser kerfed veneers. A laser may be used to produce kerf lines in thin veneers. The settings of the laser may be adjusted to adjust the width and depth of the kerf lines. The width and depth of the kerf lines may be selected in order to provide sufficient strength to the veneer while decreasing telegraphing.

8 Claims, 5 Drawing Sheets

(51) Int. Cl.
     *B27D 5/00*      (2006.01)
     *B27H 1/00*      (2006.01)
     *B32B 21/04*     (2006.01)
     *B29K 1/00*      (2006.01)
     *B29L 9/00*      (2006.01)
     *B23K 103/00*    (2006.01)

(56) References Cited

U.S. PATENT DOCUMENTS 6,737,605 B1 * 5/2004 Kern .................. B23K 26/04
                                                                   219/121.67
2015/0375343 A1   12/2015 Chapman

OTHER PUBLICATIONS

USPTO; Non-Final Office Action dated Mar. 9, 2016 in U.S. Appl. No. 14/316,330.
USPTO; Notice of Allowance dated Jul. 7, 2016 in U.S. Appl. No. 14/316,330.
Office Action dated Sep. 1, 2017 in French Application No. 15 55888.

* cited by examiner

SYSTEMS AND METHODS FOR KERFING VENEERS

CROSS REFERENCE TO RELATED APPLICATIONS

The present application is a divisional of, and claims priority to, U.S. application Ser. No. 14/316,330 entitled "SYSTEMS AND METHODS FOR KERFING VENEERS" and filed on Jun. 26, 2014, the contents of which are incorporated by reference herein in their entirety.

FIELD

The present disclosure relates generally to woodworking. More particularly, the present disclosure relates to kerfing veneers.

BACKGROUND

Many applications for wood products call for the wood to be bent or curved. Several methods for bending wood are well known in the art. Wood may be steamed at high temperatures until pliable, and the wood may be bent into a desired shape. The wood may harden in the bent shape as the heat and moisture from the steaming decreases. However, steaming the wood is labor intensive and time consuming. A second method may involve introducing chemicals to plasticize the wood. However, the chemicals can lead to discoloration of the wood and other long-term issues.

A third method for bending wood involves kerfing. During a kerfing process, a saw may make parallel linear partial-thickness cuts in a wood component. The wood may be bent around the kerf lines. However, the tolerance of mechanical kerfing methods may limit the ability of kerfing on thin wood products.

SUMMARY

A method of kerfing a veneer is disclosed. The method may include optimizing settings of a laser to produce a first kerf line having a first depth corresponding to a thickness of a backing ply in the veneer. The method may further include kerfing the first kerf line into the veneer with the laser.

In various embodiments, the method may comprise defocusing the laser. The kerfing may comprise moving the laser across the veneer at a first power. A second kerf line may be kerfed in the veneer at a second power. The second power may be greater than the first power, and a depth of the second kerf line may be greater than the depth of the first kerf line. The veneer may have a thickness of less than 0.015 inches (0.038 cm). The laser may comprise a CO2 laser in cut mode. The method may comprise kerfing a second kerf line, wherein a separation between the first kerf line and the second kerf line is between 0.003 inches-0.005 inches (0.008 cm-0.013 cm).

A veneer is disclosed. The veneer may comprise a face veneer and a backing coupled to the face veneer. The backing may comprise a first kerf line in the backing. A thickness of the veneer may be less than 0.015 inches (0.038 cm).

In various embodiments, the first kerf line may be formed by a laser. A depth of the first kerf line may be equal to a thickness of a ply of the backing. The backing may comprise a second kerf line, and a depth of the second kerf line may be greater than a depth of the first kerf line. The backing may comprise a second kerf line, and a separation between the first kerf line and the second kerf line may be between 0.003 inches-0.005 inches (0.008 cm-0.013 cm). The veneer may comprise a curve with a radius of less than 2 inches (5.1 cm). The first kerf line may be undetectable in the face veneer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for laser kerfing a wood veneer. A laser may be used to cut kerf lines in the backing of a veneer. The speed, power, and focus of the laser may be adjusted to change the width and depth of the kerf lines. The kerf lines may have varying widths or depths for a single veneer. The veneer may be bent into a curved shape around the kerf lines.

Figure 1:
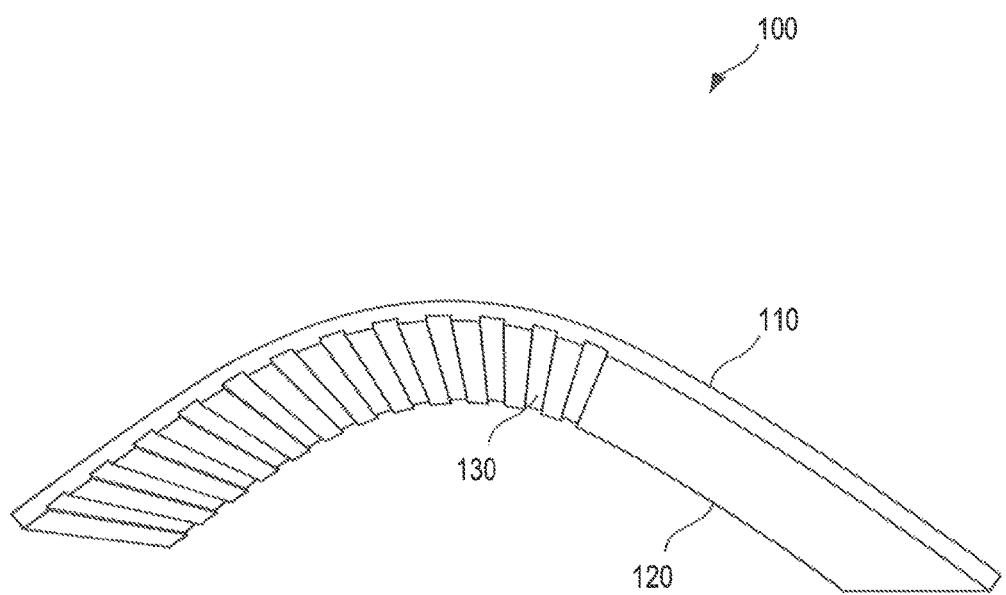
FIG. 1 illustrates a kerfed veneer, in accordance with various embodiments.

Referring to FIG. 1, a veneer 100 is illustrated according to various embodiments. Veneer 100 may comprise a face veneer 110 and a backing 120. Face veneer 110 may be a thin slice of decorative wood which is visible in an end-user product. Face veneer 110 may be located at an outer radius of a curved portion of veneer 100. Face veneer 110 may be coupled to backing 120. Backing 120 may comprise any type of material used in conjunction with veneers. For example, backing 120 may comprise wood plies, paper, phenolic, or other types of backing materials. In various embodiments, backing 120 may comprise 2 plies of material. However, in various embodiments, backing 120 may comprise any number of plies.

Veneer 100 may comprise kerf lines 130. Kerf lines 130 may be cut into backing 120. In various embodiments, kerf lines 130 may be cut into veneer 100 using a laser. In various embodiments, kerf lines 130 may extend into face veneer 110. Stated another way, the depth of kerf lines 130 may extend into face veneer 110. Kerf lines 130 may allow veneer 100 to bend more easily. Material is removed from veneer 100 by kerf lines 130. Thus, veneer 100 may be bent without compressing, or with less compression of, backing 120, as well as less stretching of face veneer 110.

Referring to FIGS. 2A-2D, cross-sections of different kerf patterns for a veneer 200 are illustrated according to various embodiments. A kerf pattern may refer to a series of kerf lines. In various embodiments, the kerf pattern may comprise a plurality of straight parallel kerf lines. However, in various embodiments, the kerf lines may be curved, such as sinusoidal or circular. In each sample shown in FIGS. 2A-2D, the veneer 200 comprises a face veneer 210, a first backing ply 221 coupled to the face veneer 210, and a second backing ply 222 coupled to the first backing ply 221. The face veneer 210, first backing ply 221, and second backing ply 222 each have a thickness T1 of 0.004 inches (0.010 cm), and the veneer 200 had a total thickness T2 of 0.012 inches (0.030 cm). The depth and pattern of kerfing are controlled to limit the likelihood of telegraphing or cracking of face veneer 210. Telegraphing refers to impressions that may appear on the veneer face which may correspond to the kerf lines. The telegraphing may be a result of stretching of the face veneer in localized areas during bending of the veneer.

Figure 2A:
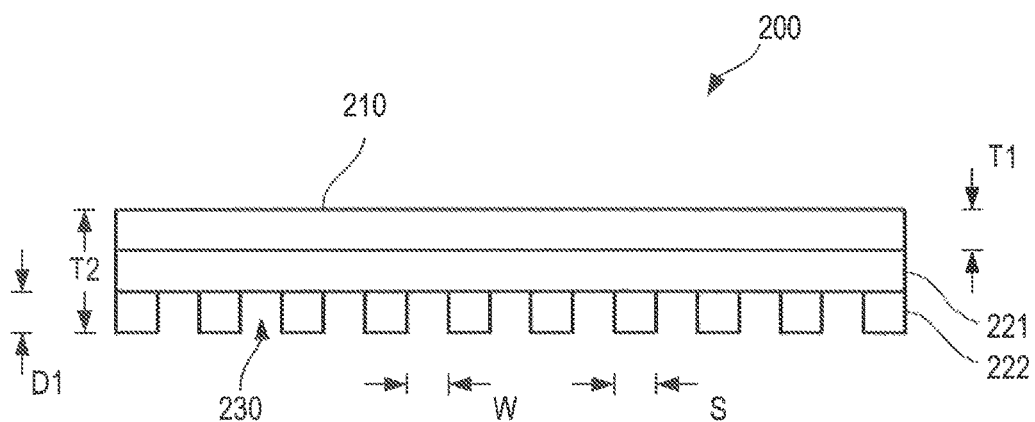
FIGS. 2A-2D illustrates cross-sections of various kerf patterns in veneers, in accordance with various embodiments.
Figure 2B:
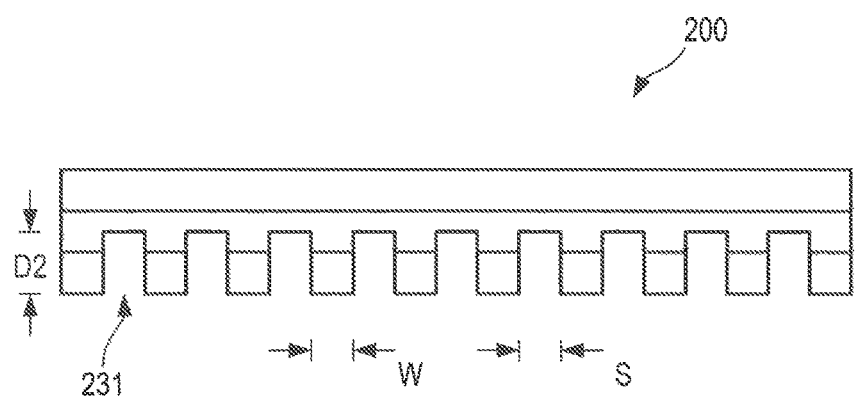

In FIG. 2A, kerfs 230 were cut into the backing at a depth D1 of 1 ply, such that depth D1 is equal to thickness T1. The kerfs 230 have a width W of 1 ply, and a separation S between kerfs was 1 ply. In FIG. 2B, kerfs 231 were cut into the backing at a depth D2 of 1.5 plies, such that depth D2 is equal to 1.5 times T1. The kerfs 231 have a width W of 1 ply, and a separation S between kerfs 231 was 1 ply.

Figure 2C:
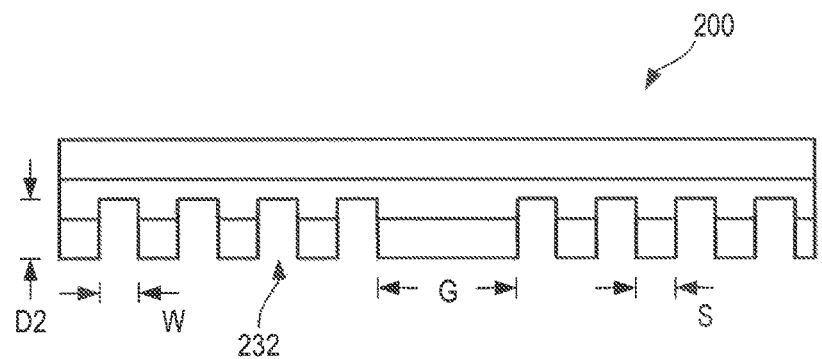

In FIG. 2C, kerfs 232 were cut in groups of four. The kerfs 232 were cut into the backing at a depth D2 of 1.5 plies. The kerfs 232 have a width W of 1 ply, and a separation S between kerfs 232 within a group was 1 ply. A separation G between groups was 3.5 plies.

Figure 2D:
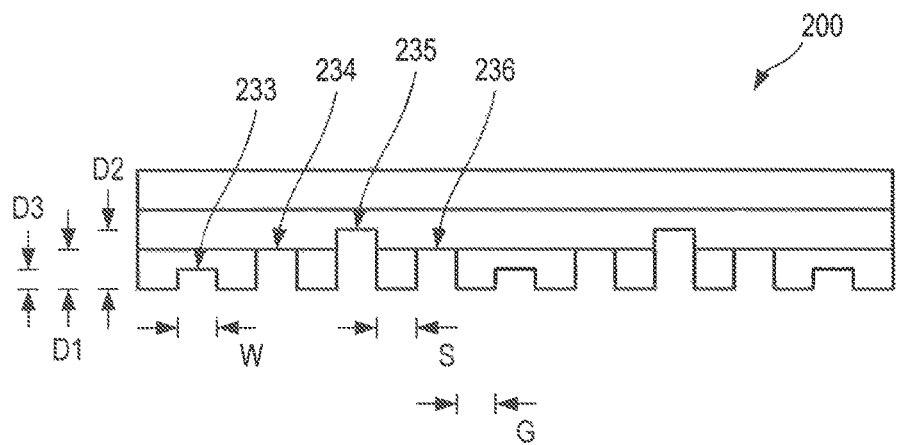

In FIG. 2D, kerfs 233, 234, 235, 236 were cut in groups of four at varying depths. Each group comprised a first kerf 233 at a depth D3 of 0.5 plies, a second kerf 234 at a depth D1 of 1 ply, a third kerf 235 at a depth D2 of 1.5 plies, and a fourth kerf 236 at a depth D1 of 1 ply. The kerfs 233, 234, 235, 236 have a width of 1 ply, and a separation between kerfs 233, 234, 235, 236 within a group was 1 ply. A separation G between groups was 1 ply. Thus, the kerfs 233, 234, 235, 236 generally followed a wave pattern, in which kerf depth gradually increases and decreases when moving across the kerf pattern. In various embodiments, the kerf pattern may follow a sinusoidal pattern.

In general, as the separation between kerf lines decreased, the strength of the veneer decreased, and the veneer was more likely to crack when the separation was too small. However, as the separation between kerf lines increased, the amount of telegraphing onto the face veneer increased. It was discovered that, for certain veneers, separations between kerf lines of about 0.004 inches (0.010 cm), or about 0.003 inches-0.005 inches (0.008 cm-0.013 cm) provided sufficient veneer strength while minimizing telegraphing.

Figure 3:
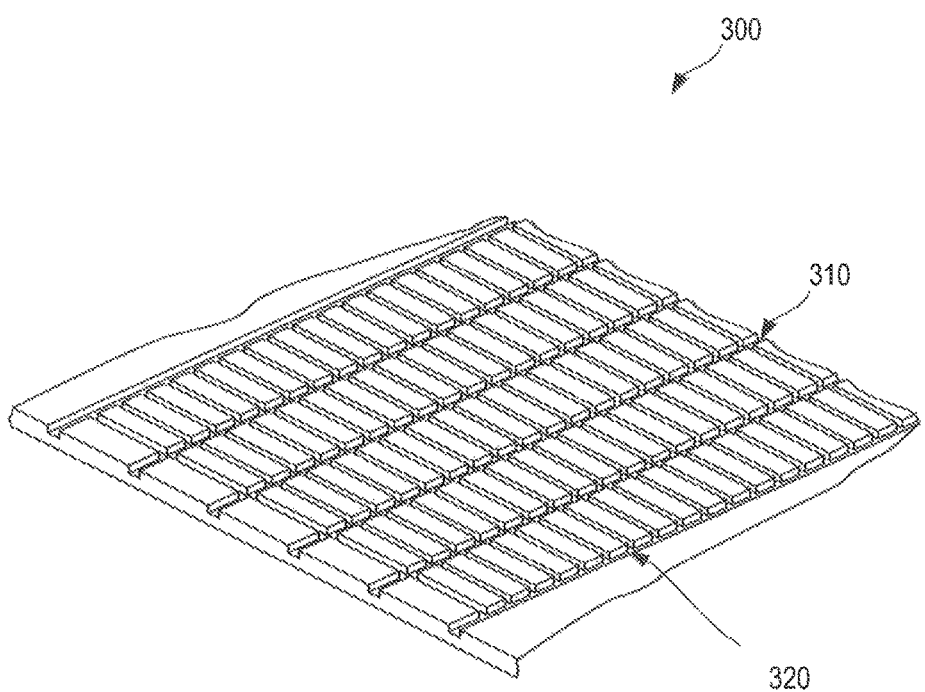
FIG. 3 illustrates a veneer having a multi-directional kerf pattern, in accordance with various embodiments.

Referring to FIG. 3, a veneer 300 having a 2-directional kerf pattern is illustrated according to various embodiments. Kerf patterns comprising parallel kerfs in one direction are generally suitable for bending a veneer around a single axis. However, in various embodiments, it may be desirable to bend veneers in complex three-dimensional shapes. Veneer 300 may comprise a first series of kerfs 310, and a second series of kerfs 320 which are perpendicular to the first series of kerfs 310. In various embodiments, the first series of kerfs 310 may be perpendicular to a grain pattern in the veneer, and the second series of kerfs 320 may be parallel to the grain pattern in the veneer 300. However, in various embodiments, neither the first series of kerfs 310 nor the second series of kerfs 320 are perpendicular or parallel to the grain pattern in the veneer 300. Those skilled in the art will recognize that multiple kerf angles may be utilized in a single veneer in order to bend the veneer into complex shapes. In various embodiments, different kerf patterns may be utilized in different directions in the same veneer. For example, the first series of kerfs 310 may have the kerf pattern illustrated in FIG. 2B, and the second series of kerfs 320 may have the kerf pattern illustrated in FIG. 2D. Similarly, any given direction may comprise any number of different kerf patterns.

Figure 4:
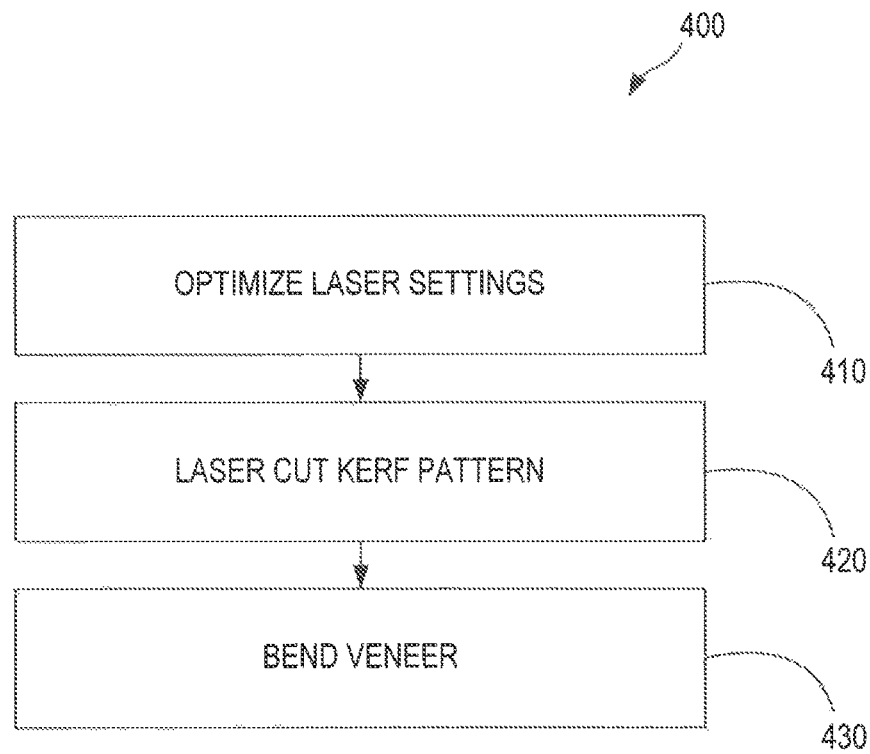
FIG. 4 illustrates a flow chart of a process for kerfing a veneer, in accordance with various embodiments.

Referring to FIG. 4, a flowchart 400 of a method for kerfing a veneer is illustrated according to various embodiments. For thicker wood components, saw blades may be used to kerf the components. However, for thin veneers, it may be difficult to mechanically kerf the veneer with the precision necessary to prevent cracking or telegraphing of the veneer.

In various embodiments, a laser may be used to kerf the veneer. In various embodiments, a $CO_2$ laser may be used, such as a 150 Watt High Speed Engraving laser system manufactured by Kern®. Settings for the laser may be optimized in order to kerf the veneer (step 410). Optimizing the settings for the laser may comprise adjusting the intensity, focus, and speed of the laser in order to cut kerfs to a desired depth in a particular veneer. In various embodiments, the laser system may have a cut mode and an engrave mode. Using the laser in cut mode may be faster than using the laser in engrave mode to produce the kerf lines. However, in cut mode, the laser is designed to cut through the veneer. In order to produce kerf lines to a desired depth without cutting through the veneer, the speed with which the laser is moved across the veneer may be increased. Additionally, as the power of laser movement is decreased, the depth of the kerf may decrease. Thus, by moving the laser in cut mode at faster speeds than designed by the laser manufacturer, and/or by adjusting the power of the laser, the laser may kerf the backing of the veneer without cutting through the veneer. In various embodiments, the kerfs may be cut at 5 inches per second (13 cm/s), or between 2-10 inches per second (5-25 cm/s).

Additionally, the power and focus of the laser may be adjusted in order to achieve the desired width and depth of kerf lines. In various embodiments, a desired width of the kerfs was 0.004 inches (0.010 cm). However, the laser system produces kerfs of 0.003 inches (0.008 cm) in width in response to being focused on the veneer. In various embodiments, the width of the kerf may be adjusted by defocusing the laser. By defocusing the laser, the laser may cut wider kerfs into the veneer, and the focus may be adjusted such that kerfs of 0.004 inches (0.010 cm) in width, or other desired widths, may be produced.

The laser may cut a kerf pattern in the veneer (step 420). In various embodiments, kerf patterns comprised kerf lines of different depths. The power of the laser may be adjusted to cut different kerf lines at different depths. For example, a first kerf line may be cut at a first depth, such as 0.5 plies, by moving the laser across the veneer at a first power. A second kerf line may then be cut at a second depth, such as 1 ply, by moving the laser across the veneer at a second power. In various embodiments, the first power may be 22 watts and the second power may be 30 watts. However, various powers may be used to achieve different depths in different materials. Thus, by altering the power of the laser, kerf lines of different depths may be produced. In various embodiments, kerf patterns that were 3.1 inches (7.9 cm) wide and four feet (120 cm) long were able to be laser cut in less than 23 minutes.

Once the kerf pattern has been cut in the veneer, the veneer may be bent into a desired shape (step 430). In various embodiments, the veneer may be bent to a radius of 2 inches (5.1 cm) or less. In various embodiments, laser kerfing may be used in conjunction with known bending processes. For example, a veneer may be laser kerfed in conjunction with a steaming or chemical treating process in order to bend the veneer. However, in various embodiments, the laser kerfing alone may be sufficient to bend the veneer. Those skilled in the art will recognize that laser kerfed veneers may be used in any industry or application where thin curved veneers are desirable.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of kerfing a veneer comprising:
   optimizing settings of a laser to produce a first kerf line having a first depth corresponding to a thickness of a backing ply in the veneer; and
   kerfing the first kerf line into the veneer with the laser.

2. The method of claim 1, further comprising defocusing the laser.

3. The method of claim 1, wherein the kerfing comprises moving the laser across the veneer at a first power.

4. The method of claim 3, further comprising kerfing a second kerf line in the veneer at a second power.

5. The method of claim 4, wherein the second power is greater than the first power, and wherein a depth of the second kerf line is greater than a depth of the first kerf line.

6. The method of claim 1, wherein the veneer has a thickness of less than 0.015 inches.

7. The method of claim 1, wherein the laser comprises a $CO_2$ laser in cut mode.

8. The method of claim 1, further comprising kerfing a second kerf line, wherein a separation between the first kerf line and the second kerf line is between 0.003 inches and 0.005 inches.

* * * * *